Figure 5:
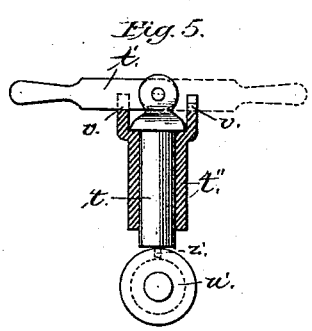
Figure 4:
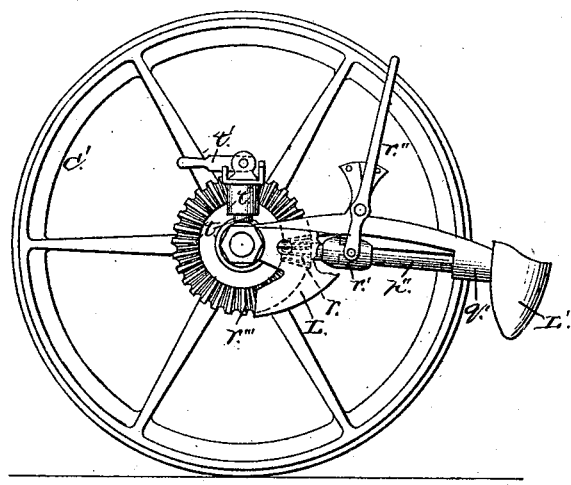
Figure 6:
Figure 7:
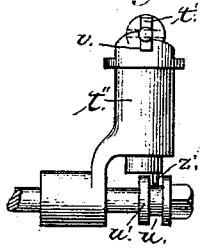
Figure 8:
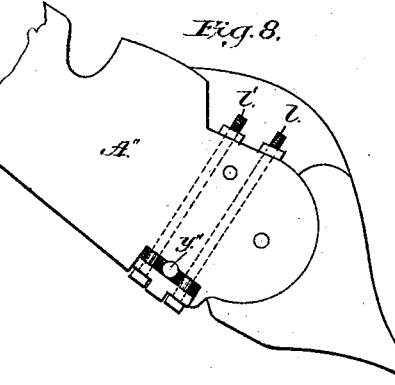

(Model.)  3 Sheets—Sheet 1.
H. S. PRUYN.
Potato Digger.
No. 236,358. Patented Jan. 4, 1881.
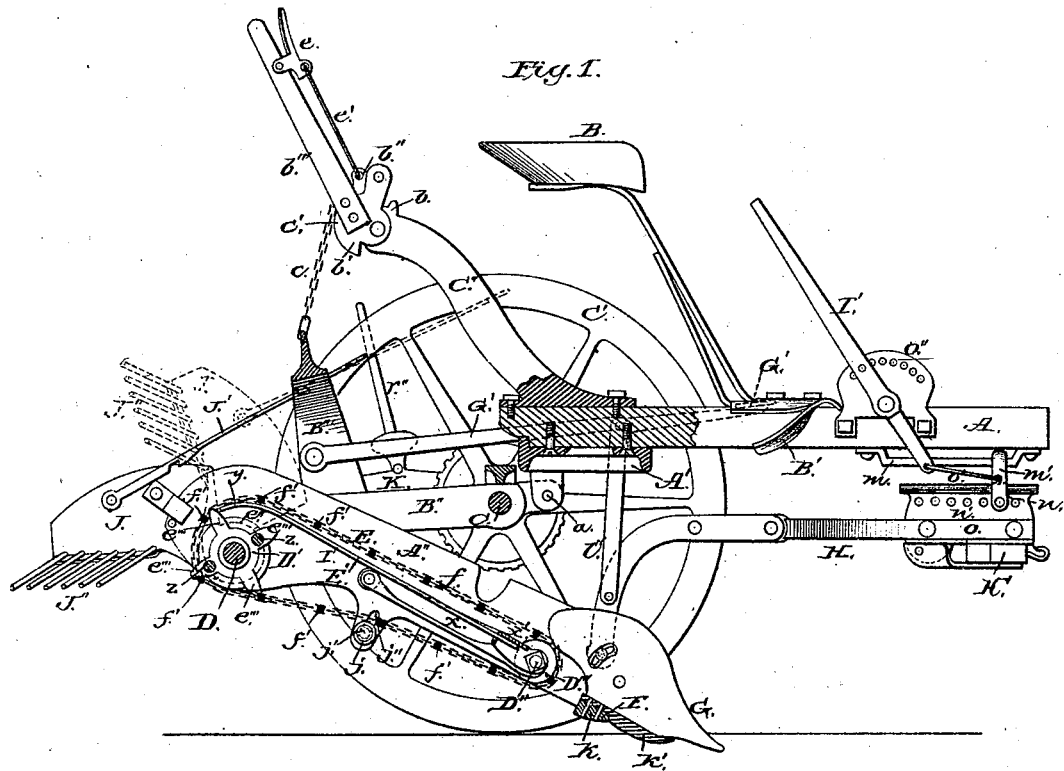
Fig. 1.
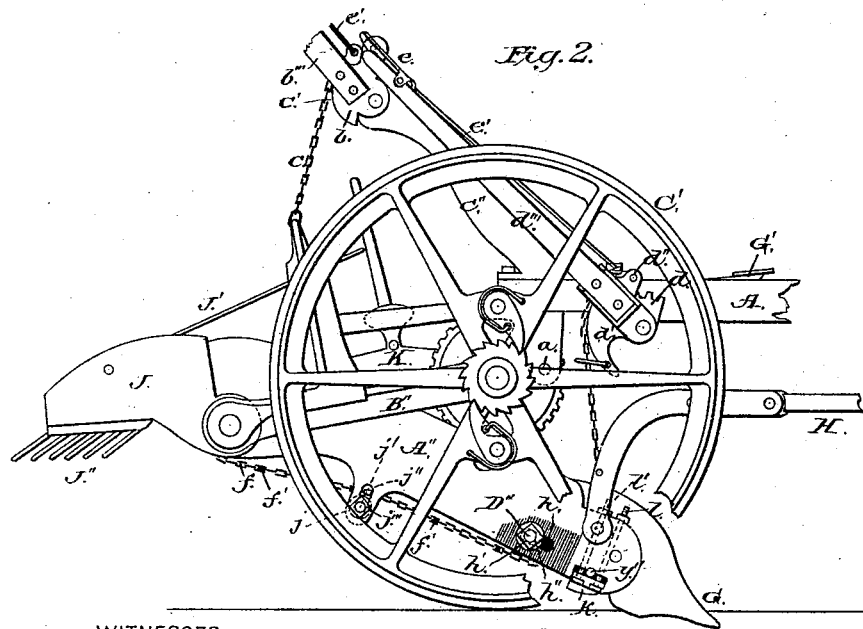
Fig. 2.
WITNESSES
John A. Eeas,
Frank J. Masi
INVENTOR
Henry S. Pruyn.
by E. W. Anderson
his ATTORNEY

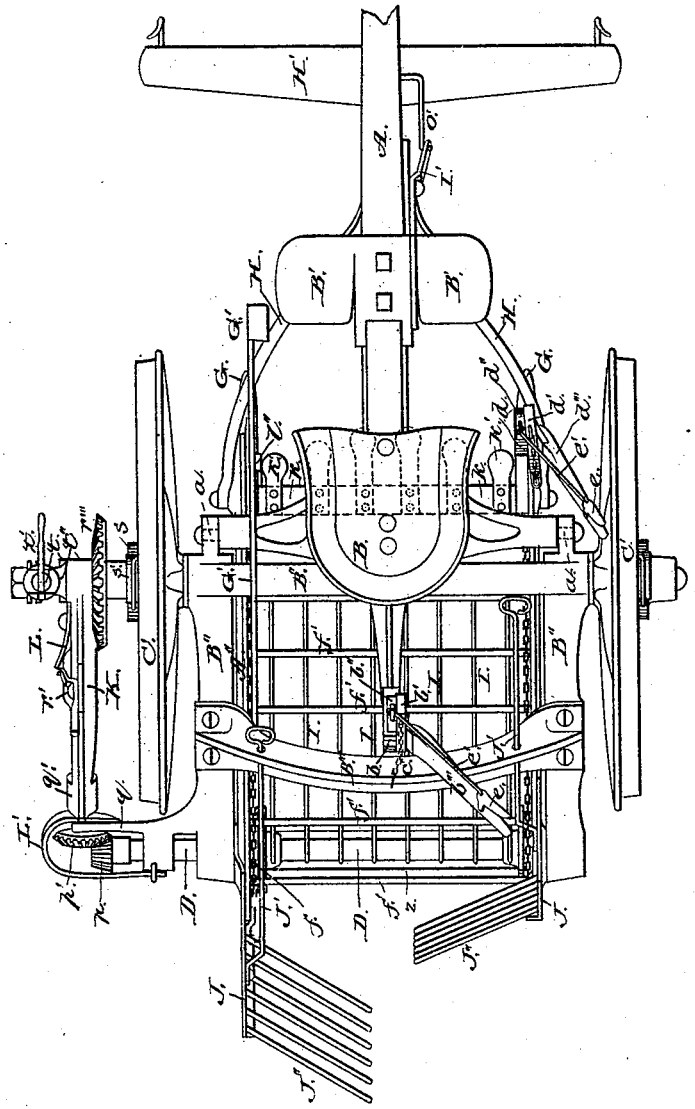

(Model.)

H. S. PRUYN.
Potato Digger.

No. 236,358. Patented Jan. 4, 1881.

WITNESSES
John A. Ellis
F. J. Masi

INVENTOR
Henry S. Pruyn
by E. W. Anderson
his ATTORNEY

UNITED STATES PATENT OFFICE.

HENRY S. PRUYN, OF CENTRE WHITE CREEK, NEW YORK.

POTATO-DIGGER.

SPECIFICATION forming part of Letters Patent No. 236,358, dated January 4, 1881.

Application filed April 22, 1880. (Model.)

*To all whom it may concern:*

Be it known that I, HENRY S. PRUYN, of Centre White Creek, in the county of Washington and State of New York, have invented a new and valuable Improvement in Potato-Diggers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my improved digger. Fig. 2 is a side view of the same. Fig. 3 is a top view thereof, and Figs. 4, 5, 6, 7, 8, 9, and 10 are details.

This invention has for its object the improvement of machines for digging, by horse-power, potatoes, beets, peanuts, and other analogous crops the edible parts of which are under the surface of the soil.

The nature of the invention consists in certain novel combinations of the devices used, as hereinafter fully shown and described.

In the accompanying drawings, the letter A designates the draft-pole supporting the driver's seat B and foot-rest B'.

A' designates a strong metallic casting bolted to the under side of the rear part of pole A, and having laterally-projecting spindles $a$, upon which are passed the free ends of the side bars of a metallic U-shaped frame, B'', having upon its under side, and suitably journaled therein, the axle C, upon which are applied the transporting and driving wheels C'. The frame B'' has near its rear end the arched beam B''', bolted thereto or forming a part thereof, as may be deemed expedient.

D indicates a metallic shaft having its bearings at the rear end of the frame B'', upon which vibrates the elevator-frame A'', extending in an inclined position to the front, beyond the axle a sufficient distance. Upon the rear end of the draft-pole is attached a rear-projecting overhanging arm, C'', carrying at its rear end the toothed segment $b$, to which is pivoted a plate, $b'$, carrying a gravitating pawl, $b''$, and vibrated by means of a lever, $b'''$.

$c$ indicates a chain secured to the bail or arch B''' of frame B'' at one end, passing over the rounded edge $c'$ of the pawl-carrier $b'$, and attached to the front part thereof. The lever $b'''$ being thrown to the front causes the rear end of the main frame to be raised and increases the inclination of the carrier-frame. This frame swings upon the shaft independent of the main frame, and its front end is raised, when requisite, by means of a mechanism composed of a toothed segment, $d$, attached to the casting A', a vibrating carrier, $d'$, a pawl, $d''$, and a lever, $d'''$, acting in all respects like the lifting mechanism of the main frame. The pawls are lifted out of engagement with their respective segments by means of a knee-lever, $e$, fulcrumed on the main levers, and connected with the pawls by means of a rod, $e'$.

Figure 9:
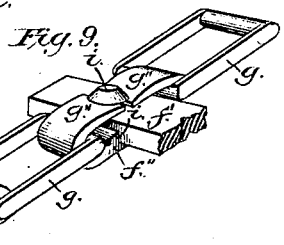
Figure 10:
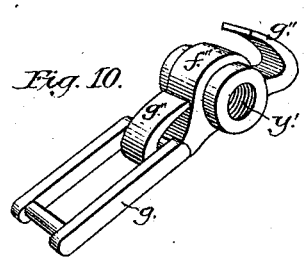

Rigidly secured upon the shaft D are the rag-wheels D', connected by the rods or rollers $z$, and consisting of a disk, $e''$, and of the radial prongs $e'''$ projecting from the sides of the said disk, leaving the perimeter smooth. At the lower end of the elevator-frame are short shafts D'', carrying pulley-wheels D'''. These wheels D' actuate the endless apron E, consisting, essentially, of the endless chains $f$, passing around the smooth perimeters of the rag-wheels aforesaid, and the parallel metallic bars $f'$, arranged at a suitable distance apart, and rigidly secured at their ends to the said chains. I prefer to construct the chains of rectangular links $g$, coupled together by the hook-ended links $g'$, whereof the hooks $g''$ are engaged with the end bars of links $g$, and then closed thereon, as shown in Fig. 9. At the points where the bars $f'$ are located the links $g'$ are replaced by a link, $f''$, having hook ends $g''$, and a transverse recess, $i$, for the reception of bars $f'$, which, being placed in the said recess and hooks $g''$ closed down thereon over the end bars of the links $g$, is secured by means of a rivet, $i'$, passing through the bar and link, or a threaded hole, $y'$, may be made through the link and the ends of bars $f'$ screwed into the same. When the elevator is actuated the prongs $e'''$ of the rag-wheels engage the bars $f'$, instead of the chains, and consequently the filling of the links of said chain with stones or stiff clay can in no degree interfere with the movements of the elevator, as would be the case did the prongs engage the chains, as is customary.

The spindles D'' extend through the longitudinal slots $h$ of the elevator-frame, and have their bearings in the washers $h'$, the inner faces of which are vertically serrated for engagement with the correspondingly-serrated faces of the side bars of the elevator-frame, and are clamped against the same by means of a nut, $h''$. By this device the spindles $D''$ are made adjustable for the purpose of taking up the slack of the elevator. The lower branches of the chains of the elevator are supported by means of pulleys $j$ rotating on spindles $j'$ extending through transverse slots $j''$ in the sides of the elevator-frame, and vertically adjustable therein by means of a clamp-nut, $j'''$, on the end of the spindle, for the purpose of increasing the tension of the chains of the elevator.

I indicates spring-rods, rigidly secured to a brace, $x'$, of the elevator-frame at their lower ends, and extending up and beyond the main shaft of the elevator. The bars of the elevator-apron travel over these spring-rods, of which the down-bent free ends $y$ are thrust up by the rods or rollers $z$, so that as often as released from such restraint they spring back and screen out the earth, while the potatoes are carried up the incline by the bars $f'$.

At the lower end of the elevator-frame, close to the pulleys $D'''$, is the potato-scoop F, consisting, essentially, of the plate $k$ and the teeth $k'$, secured to the upper side thereof. These teeth are flat-pointed and wider at their points than at their heels. They also decrease in length from the middle of the scoop-plate $k$ to each end. This form of tooth with the wide flat nib effectually raises up the raised soil as the machine is moved over the ground and delivers it to the elevator in lumps of a size to fall readily through the same. The ends of the scoop-plate $k$ are clamped to the elevator-frame by means of two bolts, $l\ l'$, and appropriate nuts, and a small roller, $y''$, is interposed between the said plate and the elevator-frame to serve as a rocking bearing for the said plate. By loosening the nuts of the front bolts, $l$, and setting up those of the rear bolts, $l'$, the inclination of the scoop-plate is increased and the bite of the teeth in the ground correspondingly increased. By loosening the nuts of bolts $l'$ and setting up those of bolts $l$ an opposite result will be obtained.

G indicates adjustable dividing-points at the lower ends of the elevator-frame, and extending beyond the scoop-fingers, as shown. These points cut the soil, weeds, or vines in parallel rows in advance of the scoop, and block out the soil, as it were, to be operated on, thus greatly facilitating the work.

The scoop is held down to its work by means of a foot-lever, $G'$, fulcrumed to the arch-beam $B'''$ of the main frame, and connected to the elevator-frame by means of a rod, $l''$. This device is particularly useful in hard, stony soils.

Rigidly secured to the under side of the draft-pole is a strong metallic guide, $m$, from which depends a sliding coupler, $m'$, having in its lower end an open key-hole slot, $n$, into which is passed endwise a metallic plate, $n'$, shaped to correspond to the slot aforesaid. This plate, in section, resembles a railroad-rail, and is rigidly secured to a metallic bail, H, terminating in front in hounds $o$, and pivoted in rear to the side rails of the elevator-frame. To this bail is secured, in the usual way, the double-tree $H'$. The lower ends of the coupler $m'$ are provided with perforations that register with corresponding perforations in the web of plate $n'$, and the front end of the draft-bail is raised or lowered by sliding the coupler forward or backward on the staple, and the adjustment, when had, is preserved by a pin or bolt passing through the perforations aforesaid. Or the slide may be connected by a pitman, $o'$, to a vertically-vibrating lever, $I'$, fulcrumed on the pole and engaging a segmental rack, $o''$, on said pole, to preserve the adjustment when had.

Pivoted to the rear end of the side pieces of the elevator-frame are the metallic plates J, raised or lowered by means of the pull-rods $J'$, and provided with the downward and rearwardly inclined rods $J''$ on its lower edge, reaching half-way, or thereabout, across the elevator. The potatoes or other roots raised by the elevator are discharged for one half of its width upon the ground, and on the other half upon the rods $J''$, by which they are directed inward and fall in the same track as the first half, both lots being sufficiently to one side to be out of the way of the draft-animals upon the return of the machine. These guide-chutes are to be used alternately, the one upon the left of the machine when the undug land is on the left, and the other when, in returning across the field, the undug land is on the right. They may, if desired, be hinged to the rear end of the elevator-frame and swung out instead of upward.

The main shaft D extends outward past the wheels C, and is provided on its end with a bevel-gear, $p$, that engages a bevel-gear, $p'$, on the adjacent end of a shaft, $p''$, having its bearing at one end in a lateral offset, $q$, of the main frame, and at the other in a bridge, K, having one end supported by the projecting end of the axle-arm and the other by a sleeve, $q'$, encircling said shaft.

$r$ indicates a small bevel-gear fixed to the shaft, or rotating loose thereon, and secured against rotation by a clutch-slide, $r'$, operated by a lever, $r''$, which gear engages a larger gear, $r'''$, fixed on the spindle of the axle. This gear is provided with a ratchet-wheel, $s$, next the wheel, which is locked against rotation to the axle-arm by means of spring-pawls $s'$ on said wheel.

The bridge K has a slight horizontal vibration from its rear end as a center, by which means the pinion $r$ of the shaft $p''$ is disengaged from and brought into engagement with the master-gear, this result being attained by means of a vertical shaft, $t$, provided on its upper end with a handle, $t'$, and journaled in an overhanging offset, $t''$, of the bridge. Upon the lower end of the shaft $t$ is an eccentric, $z'$, fitting snugly in a groove, $u$, of a sleeve, $u'$, fixed in any suitable way on the axle-arm. By turning this shaft the pinion and master-gear are disengaged or engaged at pleasure. The handle $t'$ is pivoted to the upper end of shaft $t$, so as to vibrate vertically, and may be raised out of one of two opposite lock-notches, $v$, swung round in an arc of one hundred and eighty degrees, and engaged in the other, by which means the said gear and driving-gear are locked together or kept apart, as may be desired. When the pinion $r$ is fixed on shaft $p''$ the clutch-slide $r'$ and its operating mechanism are unnecessary. The master-gear and pinion $r$ are prevented from becoming clogged by weeds by a shield, L, and the pinions $p\ p'$ by a similar shield, $L'$.

In order to prevent the earth, stones, &c., falling through the elevator from lodging on the lower branches of the chains $f$ and being carried thereby under the pulleys $D'''$, causing them to strain, stretch, or break the said chains, I use a guard-ledge, $x$, forming a part of, or secured to, the inner wall of sides of the elevator-frame, having an inclined upper surface, which directs the falling matter outward clear of said chains.

This machine, it is evident, can be used to dig beets, peanuts, and other analogous crops, as well as potatoes.

What I claim as new, and desire to secure by Letters Patent, is—

1. In a potato-digger, the combination, with the pole A, having the casting $A'$, with lateral spindles $a$, of the arched frame $B'''$, vibrating on the axle and pivoted to the said spindles, a lever mechanism on the pole for raising said frame, and an elevator-frame, $A''$, journaled to the rear part of the main frame, and adjustable independent thereof, substantially as specified.

2. The combination, with a frame, $B''$, having a rear arched brace, $B'''$, and journaled on the axle, and the pole A, pivoted to the front ends of said frame, of a lever mechanism on the pole for raising said frame, an elevator-frame, $A''$, pivoted to the rear part of said frame, and a lever mechanism for raising the front end of said elevator-frame, substantially as specified.

3. The combination, with the pole A, the main frame pivoted thereto and vibrating on the axle, and the elevator-frame pivoted to the rear end of said main frame, and having the scoop F at its lower end, of the forked draft bar or bail H, pivoted to the elevator-frame, and having T-shaped plate $n'$, and the coupler $m'$, having corresponding slot $n$, and sliding on a long guide, $m$, on the pole, substantially as specified.

4. The combination, with the pole A, having guide $m$, and the inclined scoop-frame $A''$, of the forked draft-bail H, pivoted to said frame, the T-shaped plate $n'$, fixed to its clevis end, the slide-coupler $m'$, depending from said staple, and end-slotted to receive said plate endwise, and a lever mechanism operating said slide, substantially as specified.

5. The combination, with an elevator-frame and its endless apron, of the plates or wings J, pivoted to vibrate vertically to said frame, and having the downwardly, inwardly, and rearwardly inclined parallel teeth $J''$, extending from said plates or wings half-way across the digger, substantially as specified.

In testimony that I claim the above I have hereunto subscribed my name in the presence of two witnesses.

HENRY S. PRUYN.

Witnesses:
  PHILIP C. MASI,
  JAMES T. POWELL.